US011320917B2

(12) United States Patent
Klein et al.

(10) Patent No.: US 11,320,917 B2
(45) Date of Patent: May 3, 2022

(54) TOUCH SENSITIVE AUDIO-VISUAL INPUT/OUTPUT DEVICE AND METHOD

(71) Applicant: Kano Computing Limited, London (GB)

(72) Inventors: Alex Klein, London (GB); Bruno Schillinger, London (GB); Ted Wood, London (GB); Kemal Dervish, London (GB); Elliot Schneiderman, London (GB); Peter Griffith, London (GB); Chaithrika Urmi Subrahmanya, London (GB); Vaish Sathe, London (GB); James Hicks, London (GB); Gabriel Gabor, London (GB); Ben Supper, London (GB); Dan Love, London (GB)

(73) Assignee: Kano Computing Limited, London (GB)

( * ) Notice: Subject to any disclaimer, the term of this patent is extended or adjusted under 35 U.S.C. 154(b) by 13 days.

(21) Appl. No.: 16/596,602

(22) Filed: Oct. 8, 2019

(65) Prior Publication Data

US 2021/0096666 A1 Apr. 1, 2021

(51) Int. Cl.
   *G06F 3/0354* (2013.01)
   *G06F 1/16* (2006.01)
   *G06F 3/01* (2006.01)

(52) U.S. Cl.
   CPC ........ *G06F 3/03547* (2013.01); *G06F 1/1601* (2013.01); *G06F 3/016* (2013.01)

(58) Field of Classification Search
   None
   See application file for complete search history.

(56) References Cited

U.S. PATENT DOCUMENTS

| 8,207,939 B1* | 6/2012 | Bareli | G06F 3/03543 345/163 |
| 2011/0199389 A1* | 8/2011 | Lu | H04N 19/60 345/619 |
| 2014/0139466 A1* | 5/2014 | Sakaguchi | G06F 1/1694 345/173 |
| 2014/0340372 A1 | 11/2014 | Olsson et al. | |

(Continued)

FOREIGN PATENT DOCUMENTS

EP 3509061 A1 7/2019

OTHER PUBLICATIONS

Partial European Search Report from the European Patent Office for application EP20275146, dated Feb. 24, 2021.

(Continued)

*Primary Examiner* — Nicholas J Lee
(74) *Attorney, Agent, or Firm* — Leydig, Voit & Mayer, Ltd.; Gerald T. Gray

(57) ABSTRACT

A touch sensitive audio-visual input/output device comprising an internal core comprising a controller, the controller associated with at least one processor and at least one memory store, at least one light emitter associated with the controller, at least one audio output component associated with the controller, at least one actuator provided relative to the housing and associated with the controller and configured to transmit touch inputs to the controller to control operation of the device, and a flexible, translucent outer casing for at least partially enclosing the internal core.

22 Claims, 9 Drawing Sheets

(56) References Cited

U.S. PATENT DOCUMENTS

| | | | |
|---|---|---|---|
| 2015/0091834 A1* | 4/2015 | Johnson | G06F 3/04886 345/173 |
| 2016/0054799 A1* | 2/2016 | Levesque | G06F 3/0487 345/173 |
| 2018/0188850 A1 | 7/2018 | Heath | |
| 2018/0220213 A1 | 8/2018 | Wu et al. | |
| 2018/0272644 A1 | 9/2018 | Hamada et al. | |
| 2019/0259385 A1 | 8/2019 | Heckmann et al. | |

OTHER PUBLICATIONS

Provisional Opinion Accompanying the Partial European Search Report from the European Patent Office for application EP20275146, dated Feb. 24, 2021.

\* cited by examiner

TOUCH SENSITIVE AUDIO-VISUAL INPUT/OUTPUT DEVICE AND METHOD

CROSS REFERENCES

This Application claims priority to United Kingdom Application No. 1914095.3, by Klein et al., entitled "TOUCH SENSITIVE AUDIO-VISUAL INPUT/OUTPUT DEVICE AND METHOD," filed Sep. 30, 2019, and incorporated in its entirety herein by reference.

TECHNICAL FIELD OF THE INVENTION

The present invention relates generally to entertainment devices or devices used in or for entertainment. in particular, but not exclusively, the invention concerns a touch sensitive audio-visual input/output device and method use and control of such a device.

BACKGROUND TO THE INVENTION

Devices that emit light allowing real-time visualization of music are available.

Some conventional devices simply play a pre-programmed laser show via an onboard software application.

One such device available under the LaserDock brand includes over 100 music visualizers, plus a collection of laser shows that a user can leave running.

Using an onboard software application with a wireless communication link, a user can also access laser performances tailored to songs from groups like Pink Floyd and Led Zeppelin.

This type of device emits laser light which may be damaging to user eyesight. The devices are preloaded with basic light displays or require a certain song to be played. They are therefore limited in their ability to offer varied user experience.

Embodiments of the present invention seek to overcome/ameliorate these or other disadvantages and/or to provide an improved touch sensitive audio-visual input/output device.

SUMMARY OF THE INVENTION

According to a first aspect of the invention there is provided a touch sensitive audio-visual input/output device comprising:

An internal core comprising:

A controller, the controller associated with at least one processor and at least one memory store;

At least one light emitter associated with the controller;

At least one audio output component associated with the controller;

At least one actuator provided relative to the housing and associated with the controller and configured to transmit touch inputs to the controller to control operation of the device; and A flexible, translucent outer casing for at least partially enclosing the internal core.

Providing a touch sensitive audio-visual input/output device in this configuration will enhance the functionality of the device and the user experience with the device. The device to adjust its operation, preferably its visual appearance based on the audio as well as to allow manipulation of the audio prior to playback, transmission and/or storage.

According to a second aspect of the invention there is provided an entertainment system including a touch sensitive audio-visual input/output device comprising an internal core comprising, a controller, the controller associated with at least one processor and at least one memory store, an onboard power supply to power the device, at least one light emitter associated with the controller, at least one audio output component associated with the controller, and at least one actuator provided relative to the housing and associated with the controller and configured to transmit touch inputs to the controller to control operation of the device, a flexible, translucent outer casing for at least partially enclosing the internal core, and with a software application operating on the touch sensitive audio-visual input/output device to control functionality of the device.

A second cooperative software application operating on a personal computing device may be provided whereby information can be communicated between the personal computing device to the touch sensitive audio-visual input/output device.

In an embodiment, the cooperative software application may provide media and/or control instructions to the touch sensitive audio-visual input/output device. The touch sensitive audio-visual input/output device may provide information to the cooperative software application allowing the cooperative software application to cause the personal computing device to display information on a display thereof.

In an embodiment, the device of the present invention further comprises at least one communication component configured to allow the device to send and/or receive (preferably both) sounds, music, information and/or instructions, at least some of which preferably prompt functionality or operational changes in the device.

The at least one communication component may be configured to provide at least one communication pathway on a one-to-one basis between like devices, or on a one-to-many basis between like devices.

The at least one communications component will preferably allow the connection or syncing of a device of the present invention to a remote device. The remote device may be a smartphone or tablet for example. This can enable the at least one communications component to send/receive information such as operating instructions or sound or music for playback for example.

The at least one communications component may allow the communications pathway to be used in reverse. For example. one or more lights provided on the device may be actuated by a user and then mirrored on the display of a remote device. This may be accomplished by the at least one communications component transmitting information to the remote device to cause the generation and display or one or more interfaces on the remote device to simulate or copy the lights displayed on the device.

The at least one communication component may allow any type of communication pathway to be formed using any communication protocol including particularly Wi-Fi® and Bluetooth® for example.

The at least one communication component and communication pathway will typically allow communication between two devices of the present invention. For example, a first device may be able to use the communication pathway to detect when a similar device moves into a particular proximity relative to the first device. This proximity trigger may result in the device issuing an audio, tactile and/or visual alert to the users of the respective devices.

The illumination on a first device may be transmitted to a second device for display. This allows communication based on the light transmission and/or audio. The communication format may be based around whether or one or more lights on a first device is illuminated or not, the colour of any one or more lights and/or the brightness of any one or more lights. Typically, the user can cause illumination or any one or more lights on first device and this can be communicated to a second device for display to the user of that second device, allowing the user of the second device to respond by causing illumination of any one or more lights on their device, which can then be transferred to the first device for display and so on.

Communication to and from the device of the present invention will typically occur in real time.

The device of the present invention may be adapted to capture audio using at least one audio input component, with the captured audio being available for storage, playback and/or manipulation.

The device of the present invention is typically provided with on-board memory. The on-board memory may be provided in a software format, or as a hardware component such as a storage device for example an SD card or similar. Typically, the hardware component may have a removable element such as an SD card.

The device may be capable of transmission of information via the at least one communication component. This will typically allow the user to export audio files or other information such as lighting pattern instructions. The export may occur either via the removable hardware memory component or via wireless transmission for example.

Music tracks may be created which are optimised for playback using the device of the present invention. Such optimised music tracks may contain particular information or be separated into particular components, which may in turn trigger particular functionality or actions on the device of the present invention. The device may be configured to detect particular information or particular components in a music track and actuate functionality of the device accordingly.

The user may be able to adjust the functionality or actions of the device in response to music that is played through use of the at least one actuator to provide instructions to the controller of the device.

The device of the present invention is a touch sensitive audio-visual input/output device which preferably operates or functions responsively to sound, and in particular, music. Preferably, the device of the present invention is provided with at least one actuator sensitive to touch. In particular, the at least one actuator may be sensitive to pressure with which the at least one actuator is touched in order to actuate functionality of the device.

The device will preferably function as output speaker for simple musical playback and/or for streaming music for playback. The device may obtain the music for playback from any source including from a streaming service or streaming source, from a recorded source, and/or from another similar device. One very basic use of the device is as a speaker unit paired with a smartphone or tablet or computer for example, to play music transmitted to the device from the smart phone or tablet or computer.

The device of the present invention will typically have operating software provided on-board to allow a user of the device to control the device as well as to manipulate sounds or music in a manner similar to a mixing console or digital audio workstation for example. Mixing consoles and digital audio workstations typically allow the manipulation of a music track or portion of a music track or other audio portion, in a variety of ways.

Typically, the device may allow the manipulation of audio portions using processes that affect the level (such as fading, panning, compression, noise gates, expansion or limiters), processes that affect frequency response (such as equalisers or filters), processes that affect the timing of the audio (such as reverb or tempo) and/or processes that affect directionality of the output or the input of the audio (such as panning or psuedostereophony).

The device may be provided with control functionality that allows looping of at least a portion of the audio.

The device may be provided with control functionality that allows downmixing and/or upcycling. This may involve downmixing for example from a surround sound format to stereo format to mono format and/or upcycling from mono format to stereo format to surround sound format. Different formats of audio may be possible using one or more linked devices.

The device may be provided with control functionality that allows channel separation and/or isolation. This allows separation or isolation of any one or more channels or sections of the audio, for example separation of rhythm from melody, or base from treble, or even particular instruments within the audio such as for example the drumbeat or guitar or keyboard.

Music tracks today are predominantly recorded or produced using a digital audio workstation or similar functionality which is software based. This may allow the production of music with different portions of the music track which are more easily recognisable by software provided on the device, in order to produce music which is optimised for the software of the device which in turn allows production of music optimised to allow recognition of the various portions of the music track by the software to allow the user the ability to control and/or adjust the characteristics of any one or more portions of the music track, whether for playback or storage.

For example, when recorded (or after), a single master music file may be separated into elements such as drums, base, synthesiser or effects, and vocals as examples only and/or musical instruments or musical sections. These elements may be separated into separated musical tracks or musical stems. The separated elements may be any length.

The separated musical tracks or musical stems are preferably identifiable by the software operating on the device of the present invention (and/or the cooperative software application). The software on the device (and/or the cooperative software application) can then control the functionality of the device according to one or more of the different separated musical tracks or musical stems.

The device may be configured to allow control of any one or more of the separated elements based on instructions from the user, input using at least one actuator.

The at least one actuator may be configured to detect pressure based on a depression toward the center of the device. The at least one actuator may be configured to detect pressure based on a depression circumferentially across the surface of the device. Different directional movements whilst applying pressure may actuate different functionality. A sensor network may be provided relative to the outer casing on the device to detect sliding motions on the surface of the device. Preferably the sensor network is provided on an outer side of the inner core, below the outer casing.

In a preferred form, the device of the present invention will typically be provided with particular functionality associated with each at least one actuator when the device is initially programmed. The functions are typically adjustable using the actuators themselves. The actuators can be used to change the programming or function associated with each of the actuators as a user requires, to change the initial programming.

In this way, the user can adjust the function actuated by the actuators of their own device as they please which will typically result in changes being made to the software controlling the device. Any changes are typically stored on board the device so that the functionality changes stored become the basic configuration of the device, until changed again.

A reset functionality may be provided to allow a user to reset the functions back to their initial programming configuration, if they so choose.

Actuator configuration profiles may be downloaded from a remote source. Downloaded actuator configuration profiles may be applied to the device to adjust device functionality. For example, an online store may contain a variety of actuator configuration profiles created by third parties which the user can download and install onto their device.

The function of one or more actuators may be changed singly or as a group.

The function of the actuators may be changed using a separate, but cooperative software application operating on a remote device such as a smartphone or tablet for example, from which instructions relating to the function of the actuators can be transmitted to the device.

The at least one actuator may be configured to provide slider-based control. This is may be possible both on the device using at least one actuator and/or on the software. Preferably, the slider-based control is controllable by a single motion left or right, up or down, of user input using at least one actuator. Slider based control may be provided using the cooperative software, which may receive user input based on interaction with a slider button generated and displayed on an interface on a display of a personal computing device. A user can slide the slider button as required to provide instructions to the software operating on the device as to the control of the different separated musical tracks or musical stems.

In a preferred form, the device of the present invention will not only be able to play music or sound, but will also emit light to allow visualisation of the music or sound in real-time as the music or sound is played. In some circumstances, the device may emit light to allow visualisation of music or sound without actual playback of the music or sound.

The device of the present invention is preferably configured to allow capture of sound, including music, through the provision of at least one audio input component preferably provided and associated with the controller. The device may be provided with software which allows recognition of the sound.

The device of the present invention may be operable to allow a user to manipulate the audio and/or vary the audio output.

The device of the present invention will preferably include a variety of control buttons. The control buttons are preferably separate to the actuators. The control buttons switch are preferably operable to switch the device on and off, skip to the next track in an album, forward and rewind within the track, adjust volume and adjust the tone of the audio for example. As mentioned, it is preferred that these control buttons are provided separately to the actuators. In some embodiments, the actuators may be provided with functionality allowing the control of any one or more of these aspects of the operation of the device.

The device of the present invention includes an internal core. The internal core will preferably be located within the preferred flexible, translucent outer casing. The internal core will preferably define the overall shape of the device with the outer casing adjusting to or conforming to the outer shape of the internal core. In an embodiment, the outer casing is preferably releasably fixed relative to the core. The method used to releasably fix the outer casing relative to the core will preferably render the device waterproof and/or dustproof.

The internal core is typically provided with at least two housing portions which are releasably engageable to form a housing. The housing of the internal core will preferably protect the components of the device. The housing will typically be rigid. The material of construction of the housing will preferably be chosen to provide some impact resistance in order to minimise or prevent any damage to the components housed within the internal core.

The components provided within the internal core may be potted. Any material may be used to pot the components. Typically, the potting material will be or include a polyurethane, epoxy or a silicone or a combination of any one or more of these materials.

The or each at least one actuator associated with the housing of the internal core will preferably still be operable to receive touch input through the outer casing. As will be explained further below, it is preferred that the actuators are mounted on or provided as a part of the housing of the internal core.

The device will preferably be sized and shaped to be comfortably held in the hand of the user.

In an embodiment, the device will preferably be between 50 mm and 100 mm in diameter and between 30 mm and 100 mm in height. In a preferred embodiment, the device is approximately 78 mm across and 61 mm high, as it has been found that dimensions which are approximately equivalent to these render the device comfortable to hold in one hand, allowing operation of the at least one actuator.

The inner core of the device will preferably be ovate or ovoid in shape. The device will typically be generally circular when viewed in plan. The device will preferably be oval when viewed in side elevation.

At least one actuator, and preferably a plurality of actuators are provided on the sides of the device. The at least one actuator is preferably positioned such that when the device is held in the palm of a user's hand, with the base of the device oriented downwardly, the or each actuator provided on the device is within range of the user's thumb and/or fingers.

The internal core is preferably provided with at least two housing portions releasably engageable to form the housing as mentioned above. In an embodiment, an upper housing portion and a lower housing portion are provided.

It is preferred that both or all housing portions are manufactured of a plastic material. Preferably, a rigid plastic material is used. The upper housing portion is preferably formed of a transparent or translucent plastic material to allow light to pass. The lower housing portion can be formed of plastic material having any degree of transmissivity.

The lower housing portion is preferably provided with one or more engagement assemblies or components that allow engagement of a part of the outer casing to allow the outer casing to be at least temporarily secured to, and preferably about the internal core.

Typically, the lower housing portion is provided with an opening. The opening will preferably be provided at the pole of the lower housing portion. The opening will typically be provided into a bore. The bore is preferably internally threaded.

A securing component is typically associated with the bore in the lower housing portion. The securing component will preferably be configured as a plug with an enlarged head to provide at least one clamping surface. An elongate neck preferably extends from the enlarged head. The elongate neck is typically externally threaded to allow engagement with the preferred internally threaded bore of the lower housing portion. This configuration allows the enlarged head of the plug to clamp portion of the outer casing to the internal core in order to at least partially enclose the internal core.

The lower housing portion is preferably internally configured to mount the components of the device therein and to keep the components secure within the internal core. One or more locating formations or flanges will preferably be provided internally of the lower housing portion. The locating formations will preferably be sized and located to closely receive components within the lower housing portion. This can minimise and preferably prevent movement of the components. The locating formations are preferably complementary in shape to form one or more seats or partitions within the lower housing portion to receive one or more components therein.

The lower housing portion will preferably include at least part of an attachment mechanism to attach the lower housing portion to the upper housing portion. The attachment mechanism will preferably allow separation by user as required. Separation may require a tool.

In one embodiment, the lower housing portion and upper housing portion may engage each other threadingly requiring rotation of the portions relative to one another in order to engage the engagement assembly.

One or more clips or similar are preferred to attach the lower housing portion to the upper housing portion. One or more clips may be provided on at least one of the lower housing portion and the upper housing portion such that when aligned and pushed together in a linear direction, the one or more clips engage to hold the lower housing portion to the upper housing portion.

As mentioned above, it is preferred that the upper housing portion be transmissive to light, at least adjacent to the at least one light emitter. Preferably, the upper housing portion is transparent.

Although other shapes are possible, the upper housing portion is preferably part ovoid in shape, as is the lower housing portion. The upper housing portion is preferably complementary in shape to the lower housing portion.

The upper housing portion will preferably include at least part of an attachment mechanism to attach the upper housing portion to the lower housing portion.

The lower edge of the upper housing portion and the upper edge of the lower housing portion are preferably shaped to allow components of the device to fit in shaped portions between the respective edges. One or more scallops or scallop portions may be provided. This will preferably allow access to components within the housing by a user or at least to control components to control the components within the housing.

The upper housing portion is preferably internally configured to seat or position components, particularly at least one sensor associated with the at least one actuator.

The upper housing portion is preferably provided with a plurality of flexible wings. The flexible wings allow depression of any one or more flexible wings to transmit touch input to the at least one actuator. At least one actuator is preferably provided adjacent to a respective flexible wing.

Preferably, a plurality of incisions is made through the body of the upper housing portion to create a plurality of flexible wings. Preferably, adjacent incisions will function to separate a portion from the main body of the upper housing portion. Typically, an incision is formed about a periphery of the separated portion with a connecting portion provided, to connect the separated portion with the main body of the upper housing portion. This will preferably allow the separated portion to move when force is applied by user, for example, when the separated portion is pressed or depressed.

Use of a plastic material to form the upper housing portion, even a rigid plastic material will allow a separated portion to flex or move about the connecting portion, thereby forming depressible buttons from each separated portion. In an embodiment, an actuator, preferably a sensor, is associated with each of the separated portions.

Each of the separated portions may be provided with an identifier. The identifier may be provided on or into an outer surface of the or each separated portion. Preferably, the identifier is or includes an identifier which is visual such as one or more letters or symbols or numbers for example, and/or tactile such as one or more protrusions for example. The identifier may be or include a depression formed into an outer surface of the separated portion. In an embodiment, the identifier is a part spherical depression formed into an outer surface of each separated portion.

Any number of separated portions may be provided. Preferably the separated portions are spaced circumferentially about the upper housing portion. In an embodiment, eight separated portions are provided. In this configuration, two separated portions are provided in each quadrant of the substantially circular upper housing portion when viewed in plan.

Typically, the separated portions are located in cardinal and intercardinal positions, about the upper housing portion.

The separated portions are preferably of sufficient size to allow use of the separated portion as a button. Typically, the separated portions are provided in such a way that the light can be transmitted from the upper housing portion substantially unobstructed by the preferred incisions which may cause reflection/refraction of the light as it passes.

A separated portion may be provided at an upper pole of the upper housing portion.

The lower part of each of the radial separated portions will preferably extend into scalloped portions provided in an upper edge of the lower housing portion.

In an embodiment, the or each attachment mechanism used to attach the lower housing portion to the upper housing portion will typically be provided on intermediate portion of the upper housing portion, provided between separated portions.

The internal core of the present invention includes a control board, preferably within the housing. The controller may be of any type. A printed circuit board (PCB) type controller is preferred.

The controller is preferably mounted relative to or provided as a part of a mounting plate. The mounting plate is preferably located within the housing. Preferably, the mounting plate of provided within the lower housing portion. Components of the device may be provided below the mounting plate within the housing, such as for example one or more batteries, audio speakers, an on/off button, and a charging port. Some components of the device may be provided above the mounting plate within the housing, such as one or more light emitters and the at least one actuator.

Typically, the mounting plate will be located extending substantially transversely within the upper part of the lower housing portion. Most of the components including the controller will typically be mounted below the mounting plate within the housing. The mounting plate will typically separate the internal volume of the housing.

In an embodiment, a sensor chassis is provided above the mounting plate. The at least one light emitter will typically be mounted relative to an upper surface of the mounting plate. In a preferred form, a plurality of resiliently mounted sensor actuators mounted above the mounting plate. Preferably, the sensor actuators are mounted to and extend upwardly above the plate (and above the preferred sensor chassis).

Normally one or more power supply to power the device is preferably provided in the internal core. In one form, the one or more power supply will be or include one or more batteries. Typically, a single battery is provided. The one or more batteries may be any type of batteries.

Preferably, the power supply will be rechargeable, preferably in situ. As mentioned above, a charging port may be provided which is externally accessible. If provided, a charging port will typically be waterproof and/or dustproof. In another form, an inductive charging mechanism may be provided.

The on-board power supply is preferably located in the lower housing portion, preferably below the mounting plate.

The device of the present invention includes at least one light emitter. The at least one light emitter is preferably provided within the housing of the internal core. Preferably, a plurality of lights are provided. Although any type of light may be provided, one or more LEDs or similar are preferred for their small size, low power usage and adjustability in terms of brightness, colour and/or whether they are lit or not.

The number of lights provided in the internal core will preferably correspond to the number of separated portions which are provided. In an embodiment where eight separated portions are provided, eight lights are preferably provided, one for each of the separated portion. In the configuration where a separated portion is provided on the pole of the upper housing portion, a light is preferably provided for that separated portion as well.

Preferably, each of the lights are provided relative to an upper side of the preferred mounting plate. The lights are preferably upwardly and/or outwardly directed. Each light is preferably offset from each separated portion.

Each light may be provided directly underneath a separated portion depending upon the effect required. The lights are typically spaced about the internal core.

The internal core of the device includes at least one audio output component. In an embodiment, a single audio output component is provided. The single audio output component is preferably a speaker or similar. Any type of speaker may be provided.

Where a speaker is provided as the audio output component, the speaker is preferably associated with a speaker horn to direct the sound issuing from the speaker in a particular direction. Typically, the outer end of the speaker horn will extend through the housing. Preferably, the outer end of the speaker horn will be provided between the upper housing portion and the lower housing portion. Typically, the outer end of the speaker horn is substantially coplanar with the outer surface of the housing.

At least one audio input component may be associated with the controller. The audio input component is preferably located within the housing of the internal core. Preferably, at least one microphone or other type of audio input device is provided. Typically, a single microphone or other audio input device is provided. The at least one audio input component will preferably allow capture of sound from a source external to the device. The at least one audio input component is preferably mounted least partially within the housing of the internal core, to extend between the upper housing portion and lower housing portion. The at least one audio input component may be separated within the device from the speaker and speaker horn. Any type of microphone can be used.

A two-way component may be provided to function as both the audio output device and the audio input device.

The internal core of the device of the present invention also comprises at least one actuator associated with at least one of the at least two housing portions and with the controller and which is configured to transmit touch inputs to the controller to control operation of the device.

In a preferred form, the at least one actuator is or includes a force sensitive sensor. This type of sensor will preferably detect touch and also measure the force applied to the actuator. The force can be measured in terms of degree or quantum of force and/or duration of application of the force. Preferably, the device of the present invention will use touch and also one or more characteristics of the force applied to the actuator, to actuate different functions depending on the one or more characteristics of the force applied.

In a preferred form, the at least one actuator is or includes a force sensitive resistor sensor.

The at least one actuator is preferably resiliently mounted relative to the preferred mounting plate within the housing of the internal core. The actuator, or a part of the actuator preferably extends at an angle to the mounting plate in order to fit within the housing. Preferably a part of the actuator will abut a portion of an inner surface of a separated portion when at rest.

Preferably, an actuator is provided relative to each of the separated portions of the upper housing portion. A plurality of actuators is therefore normally provided. Preferably, the number of actuators provided is in one-to-one conformity with the number of lights provided. Preferably, touching an actuator will actuate at least one light. Touching actuator may actuate control functionality to change the operation of the device. Touching an actuator may actuate more than one light. Touching an actuator may actuate more than one control function. Typically, the functionality that touching the actuator actuates will be dependent upon the characteristics of the touch and particularly, preferably one or more of the characteristics of the force applied to the actuator.

For example, touching an actuator with one level force may actuate the light between turned on or off, touching with a different level force actuating a particular colour of light and touching with a third level force actuating control functionality. Any alternative configuration or functionality may be provided such as for example, there may be only two levels of force, a first level at which the light is on in a particular colour allowing the user to cycle through the colours available, and a second level force actuating control functionality associated with that actuator.

The actuators are preferably mounted relative to the sensor chassis. The sensor chassis is typically provided above the preferred mounting plate, below the preferred sensors and below the upper housing portion. The preferred sensor chassis will be partly spherical in shape. Typically, a sensor pad will be provided on the sensor chassis for each of the sensors. The provision of a sensor pad may limit the degree to which the sensor can be depressed. The sensor pad may include additional sensing functionality, for example to sense the degree of force applied to the actuator. Each of the sensors will preferably be provided with a sensor pad on an upper side thereof.

Each sensor may be provided with portion to enhance tactile comfort, such as to provide particular tactile feel and/or to minimise clicking.

Audible, visual and/or tactile feedback may be provided when an actuator is actuated. For example, typically a light will be lit when an actuator is actuated. A vibration may be provided when an actuator is actuated. The feedback may be provided in different intensities dependent upon the force applied to the actuator.

The device of the present invention includes a flexible, translucent outer casing at least partially enclosing the internal core. The outer casing may be provided from any flexible material. Preferably, a cushioning or shock absorbent material is provided. A preferred material for construction of the outer casing is silicone or similar to provide tactile comfort for user and also cushioning characteristics to protect components within the internal core, and the internal core itself.

Preferably, the outer casing will be provided in an ovoid shape. The outer casing is typically continuous except for access openings provided to allow access to or from components of the device. For example, one or more speaker holes will typically be provided in the outer casing. An opening may be provided for the power button and/or a charging port if provided. An opening may be provided for a microphone. An opening may be provided for one or more volume buttons (increase/decrease).

Alternatively, depressible control buttons may be provided relative to the internal core and the flexible outer casing simply deforms when pressed to actuate the depressible control buttons.

Any control buttons for basic functionality such as power volume for example will typically be provided at or close to the equator of the device. Preferably, any basic functionality control buttons will be spaced about the equator of the device or at least separated from one another.

Identifying indicium may be provided on the outer casing. Any type and configuration of identifying indicium may be provided. In one embodiment, a number of protrusions may be provided, preferably the pattern which is recognisable to the user. A logo may be provided. The protrusions may form the logo. Typically, any identifying indicium is provided adjacent to the upper pole of the outer casing. In this position, any identifying indicium will typically overlie a light and/or an actuator.

One or more masks may be provided between the at least one light emitter and the outer casing so as to only allow light to be emitted in one or more particular locations of the device. Typically, openings will be provided in the mask juxtaposed relative to the actuators and/or lights or to illuminate the identifying indicium for example.

The provision of a flexible outer casing will allow the user to depress the actuators on the internal core through the outer casing whilst being comfortable to touch. The provision of a translucent outer casing will typically diffuse or obscure the nature and appearance of the internal core.

The outer casing will typically be resilient. The outer casing will preferably be deformable.

The opening will typically be provided in the outer casing, at a lower side thereof. The opening will preferably allow access to, and typically insertion and removal of the internal core from the outer casing by deforming the outer casing in order to allow passage of the internal core through the opening.

The preferred opening in the outer casing will be provided with a ledge portion of lesser thickness than the main part of the outer casing. The ledge portion will typically be provided circumferentially about the opening. In use, the ledge portion will typically be clamped between the outer surface of the internal core and the enlarged head of the preferred plug in order to seal the outer casing about the core.

The device of the present invention will preferably provide an entertainment aid that allows visualisation of music using one or more lights as well as providing the user with the ability to manipulate the audio output from the device.

DETAILED DESCRIPTION OF THE INVENTION

In order that the invention may be more clearly understood one or more embodiments thereof will now be described, by way of example only, with reference to the accompanying drawings, of which:

With reference in to the accompanying Figures, a touch sensitive audio-visual input/output device 10 is provided. The device 10 is illustrated generally in FIGS. 1 to 5.

Figure 13:
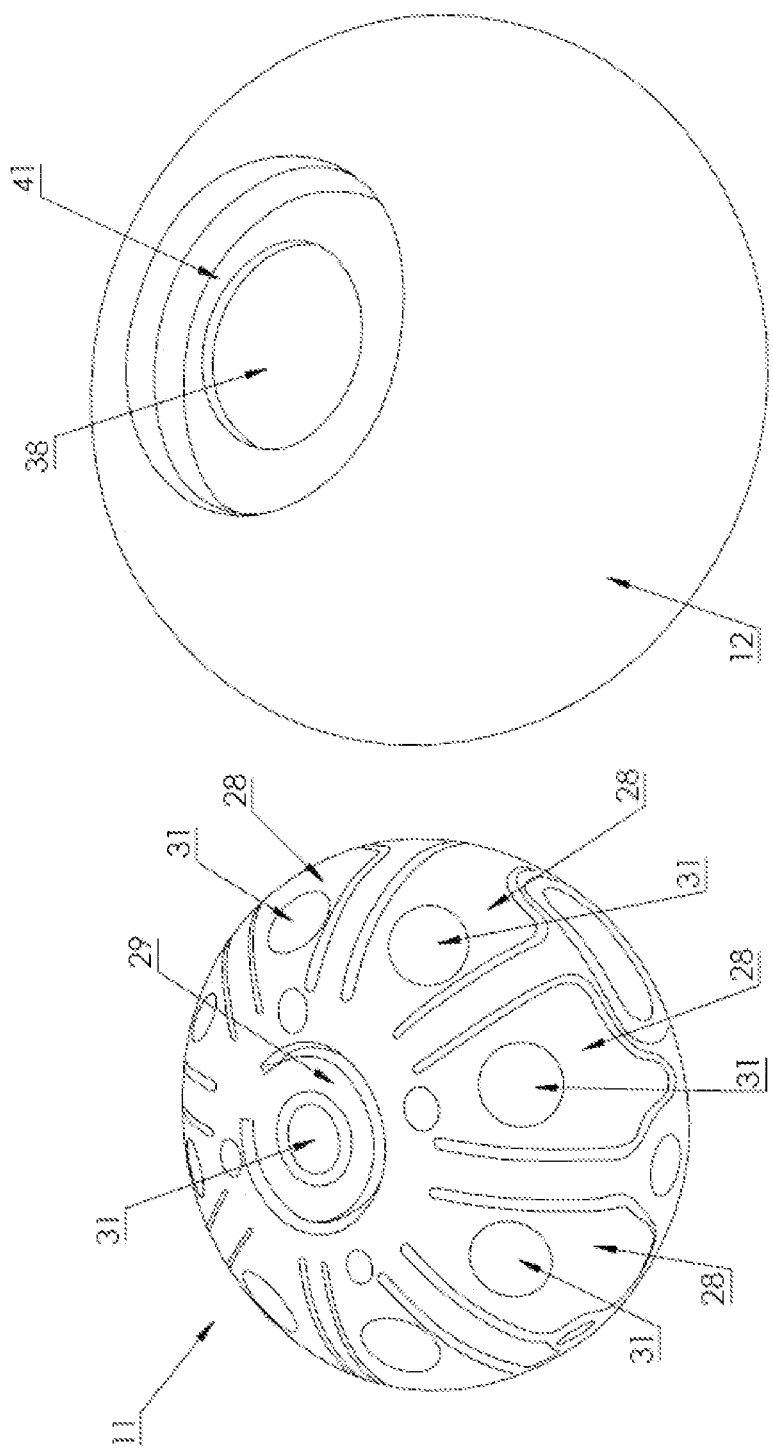
FIG. 13 is an axonometric view of an internal core with the outer casing removed according to an embodiment.

As illustrated in FIG. 13, the touch sensitive audio-visual input/output device 10 comprises an internal core 11 and a flexible, translucent outer casing 12 for at least partially enclosing the internal core.

The internal core 11, best illustrated in FIGS. 6 to 11 comprises:

A pair of housing portions releasably engageable to form a housing as illustrated in FIGS. 6 to 9;

A controller 13 within the housing, the controller 13 associated with a processor 19 to implement instructions and programs and at least one memory store;

An onboard battery 14 to power the device;

A plurality of lights 15 each associated with the controller 13; and a plurality of actuator sensors 18 provided within the housing and associated with the controller 13 and configured to transmit touch inputs to the controller 13 to control operation of the device 10.

A two-way device that functions as both an audio output speaker and an audio input microphone 17 is provided associated with the controller 13.

The device 10 of the illustrated embodiment further comprises a wireless communication component configured to allow the device 10 to send and/or receive (preferably both) sounds, music, information and/or instructions, at least some of which prompt functionality or operational changes in the device 10.

The wireless communication component may be configured to provide at least one communication pathway on a one-to-one basis between like devices, or on a one-to-many basis between like devices.

The wireless communications component allows the connection or syncing of a device 10 to a remote device, for example a smartphone or tablet, in order to send/receive information such as operating instructions or sound or music for playback for example.

The wireless communications component also allows the communications pathway to be used in reverse, with one or more lights 15 provided on the device 10 which are actuated by a user then mirrored on the display of a remote device such as a smartphone or tablet for example, through the generation and display or one or more interfaces on the smartphone to simulate or copy the lights 15 displayed on the device 10.

The wireless communication component may allow any type of communication pathway to be formed using any communication protocol including particularly Wi-Fi® and Bluetooth® and different pathways may be used for different purposes, such as Wi-Fi® to send and receive data such as music and Bluetooth® to link devices. The device may be capable of transmission of information via the wireless communication component. This will typically allow the user to export audio files or other information such as lighting pattern instructions, either via the removable hardware memory component or via wireless transmission for example.

The device of the present invention is typically provided with on-board memory. The on-board memory can be provided in a software format, or as a hardware component such as a storage device for example an SD card reader/writer or similar with a removable element such as an SD card.

The device 10 is a touch sensitive audio-visual input/output device which operates or functions responsively to sound, and in particular, music. The device 10 is provided with a plurality of actuator sensors sensitive to touch, and in particular, the pressure with which the actuator is touched in order to actuate functionality of the device.

The device will typically have operating software provided on-board to allow a user of the device to manipulate sounds or music in a manner similar to a mixing console or digital audio workstation for example. Mixing consoles and digital audio workstations typically allow the manipulation of a music track or portion of a music track or other audio portion, in a variety of ways.

In a preferred form, the device of the present invention will typically be provided with particular functionality associated with each actuator when the device 10 is initially programmed. The functions are typically adjustable using the actuators themselves, in order to allow a user to change the programming or function associated with each of the actuators as they require, to change the initial programming.

In this way, the user can adjust the function actuated by the actuators of their own device as they please which will typically result in changes being made to the software controlling the device. Any changes are typically stored on board the device so that the functionality changes stored become the basic configuration of the device, until changed again.

As illustrated in FIGS. 1 to 5, the device 10 includes a variety of control buttons, separate from the actuators. A power button 20 allow the device 10 to be switched on and off is provided. A pair of control buttons 17 that can be used to allow a user to skip to the next track in an album, to allow user to forward and rewind within the track, and adjust volume of the audio are also provided.

The internal core 11 is located within the flexible, translucent outer casing 12. The internal core 11 of the illustrated embodiment defines the overall shape of the device 10 with the outer casing 12 conforming to the outer shape of the internal core 11.

In the illustrated embodiment, the outer casing 12 is releasably fixed relative to the core 11.

The internal core 11 of the illustrated embodiment is provided with two housing portions which are releasably engageable to form a housing. In the illustrated embodiment, the device 10 is approximately 78 mm across and 61 mm high.

The inner core 11 is generally ovoid in shape. The device is generally circular when viewed in plan and generally oval when viewed in side elevation as shown in FIGS. 2 and 3, and FIGS. 4 and 5 respectively.

An upper housing portion 21 and a lower housing portion 22 are provided.

As illustrated, both housing portions are manufactured of a plastic material. Preferably, a rigid plastic material is used. The upper housing portion 21 is preferably formed of a transparent plastic material to allow light to pass through. The lower housing portion 22 can be formed of plastic material having any degree of transmissivity and need not be transparent.

The lower housing portion 22 is provided with an engagement assembly that allows engagement of a part of the outer casing 12 to allow the outer casing 12 to be at least temporarily secured to, and about the internal core 11.

In the illustrated form, the lower housing portion is provided with an opening 23 provided at the pole of the lower housing portion 22. The opening leads into a short, internally threaded bore.

Figure 12:
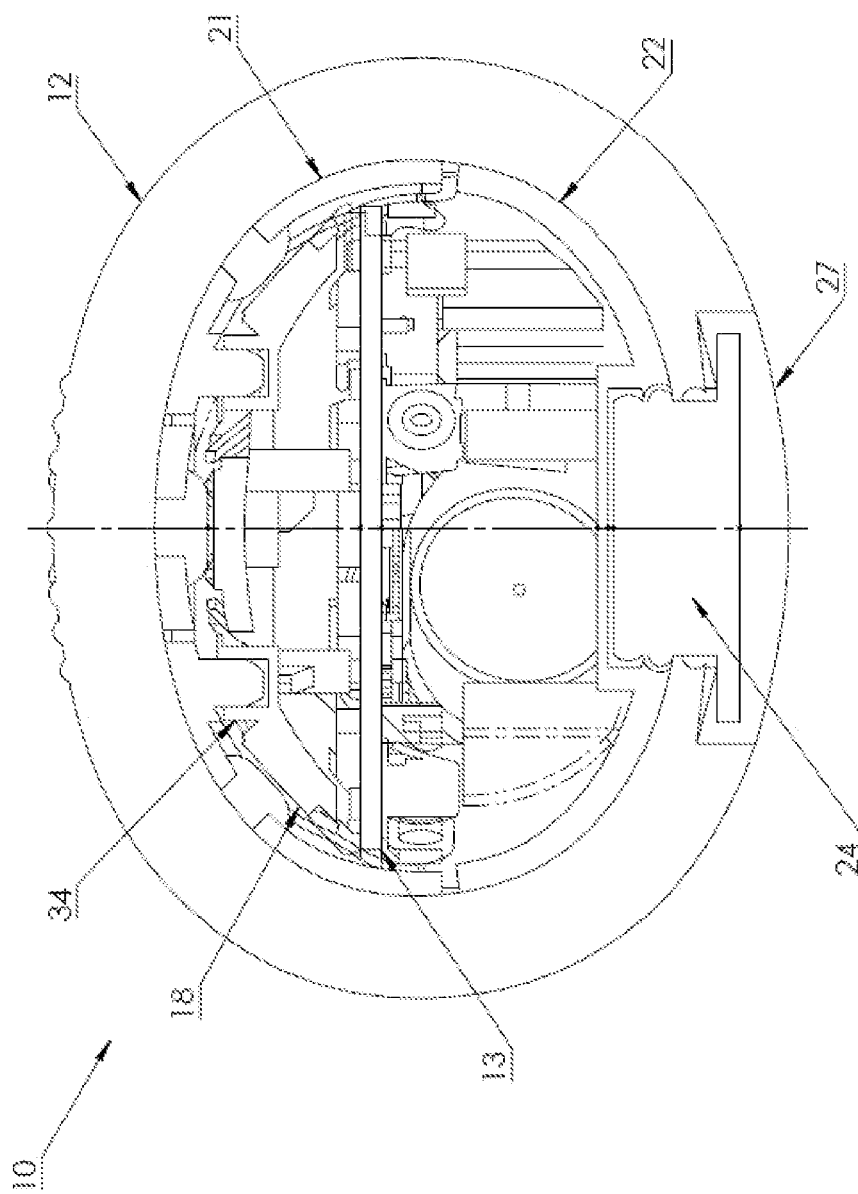
FIG. 12 is a section view along a midline of the internal core illustrated in FIG. 11.

A securing plug 24 is associated with the bore in the lower housing portion 22. The securing plug 24 has an enlarged head 25 to provide a clamping surface and an elongate neck 26 extending from the enlarged head. The elongate neck 26 is externally threaded to allow engagement with the internally threaded bore of the lower housing portion 22. This configuration allows the enlarged head 25 of the plug 24 to clamp portion of the outer casing 14 to the internal core 11 in order to at least partially enclose the internal core 11. In FIG. 12, the plug 24 is provided with an outer layer of material 27 which is the same as that used to form the outer casing 12 which then completely encases the inner core 11.

Figure 10:
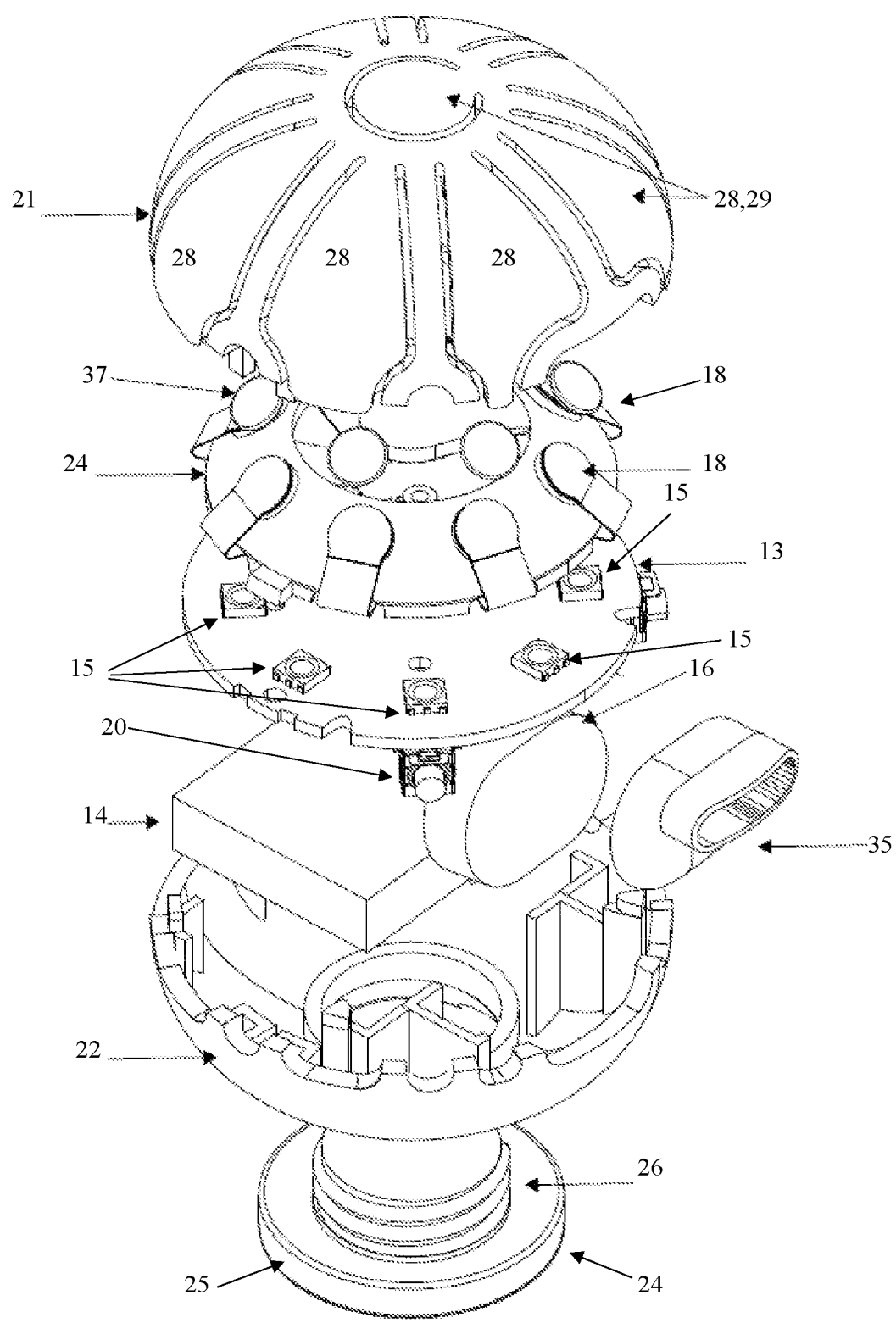
FIG. 10 is an exploded view from above of the internal core illustrated in FIG. 7.

As shown in FIG. 10, the lower housing portion 22 is internally configured to mount the components of the device 10 therein and to keep the components secure within the internal core 11. Locating formations are provided internally within the lower housing portion 22. The locating formations are sized and located to closely receive components within the lower housing portion 22, to minimise and preferably prevent movement of the components. The locating formations are preferably complementary in shape to form one or more seats or partitions within the lower housing portion 22 to receive one or more components therein as shown.

The lower housing portion 22 and/or the upper housing portion 21 include at least part of an attachment mechanism to attach the lower housing portion 22 to the upper housing portion 21. The attachment mechanism will allow separation by user as required. Separation may require a tool.

One or more clips or similar are preferred to attach the lower housing portion 22 to the upper housing portion 21 such that when aligned and pushed together in a linear direction, the one or more clips engage to hold the lower housing portion 22 to the upper housing portion 21.

Figure 11:
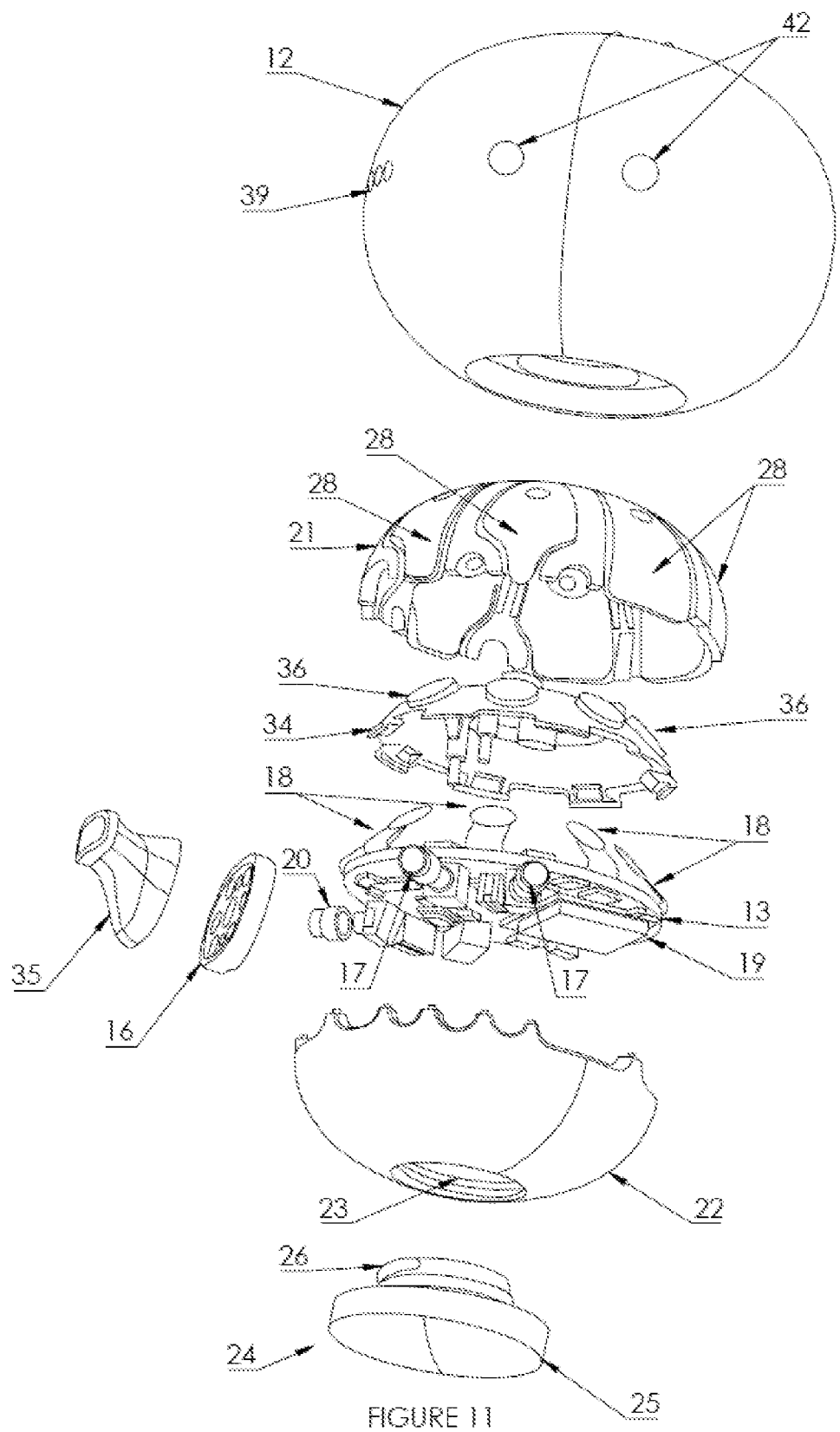
FIG. 11 is an exploded view from below of the internal core illustrated in FIG. 7.

As best seen in FIGS. 10 and 11, the lower edge of the upper housing portion 21 and the upper edge of the lower housing portion 22 are shaped to allow components of the device 10 to fit in shaped portions between the respective edges. One or more scallops are provided. This will allow access to components within the housing by a user or at least to control components to control the components within the housing.

The upper housing portion 21 is provided with a plurality of flexible wings or buttons 28 allowing a user to depress any one or more flexible wings or buttons 28 to transmit touch input to the actuator sensors 18, each provided adjacent to a respective flexible wing or button 28. The wings or buttons 28 are formed in the illustrated embodiment by a plurality of incisions 30 made through the body of the upper housing portion 21. As shown, adjacent incisions 30 function to separate a portion of the wings or buttons 28 from the main body of the upper housing portion 21. An incision 30 is formed about a periphery of the separated wings or buttons 28 with a connecting portion provided to connect the separated wings or buttons 28 with the main body of the upper housing portion 21. This allows the separated wings or buttons 28 to move when force is applied by a user, for example, when the separated wing or button 28 is pressed or depressed.

A plurality of wings or buttons 28 are provided circumferentially around the sides of the core 11 such that when the device 10 is held in the palm of a user's hand, with the base of the device 10 oriented downwardly, the wings or buttons 28 provided on the device 10 are within range of the user's thumb and/or fingers.

Use of a plastic material to form the upper housing portion 21, even a rigid plastic material allows a separated wing or button 28 to flex or move about the connecting portion, thereby forming depressible wings or buttons 28.

An actuator sensor 18 is associated with each of the separated wings or buttons 28.

Each of the separated wings or buttons 28 is provided with an identifier in the form of a part spherical depression 31 formed into an outer surface of each wing or button 28.

The separated wings or buttons 28 are spaced circumferentially about the upper housing portion 21. In the illustrated embodiment, eight separated wings or buttons 28 are provided, two separated wings or buttons 28 are provided in each quadrant of the substantially circular upper housing portion 21 when viewed in plan. The separated wings or buttons 28 are located in cardinal and intercardinal positions, about the upper housing portion 21.

The separated wings or buttons 28 are of sufficient size to allow use as a button. Typically, the separated wings or buttons 28 are provided in such a way that the light can be transmitted through the upper housing portion 21 substantially unobstructed by the incisions 30 which may cause reflection/refraction of the light as it passes.

As shown separated wing or button 29 may be provided at an upper pole of the upper housing portion 21.

The lower part of each of the radial separated wings or buttons 28 extend into scalloped portions provided in an upper edge of the lower housing portion 22.

The attachment mechanisms used to attach the lower housing portion 22 to the upper housing portion 21 are provided on intermediate portions of the respective housing portions, provided between separated wings or buttons 28.

The internal core 11 of the illustrated embodiment includes a controller 13 including a processor 19 mounted on a printed circuit board (PCB) within the housing.

The PCB is provided as a part of a mounting plate which is located within the housing. The controller PCB/mounting plate 13 is provided within the lower housing portion with components of the device provided below the controller PCB/mounting plate 13, such as for example the battery 14, two way speaker 16, the on/off button 20, and a charging port 33. Some components of the device 10 are provided above the controller PCB/mounting plate 13 within the housing, such as the lights 15 and the actuator sensors 18.

As shown in FIGS. 10 and 11, the controller PCB/mounting plate 13 extends substantially transversely within the upper part of the lower housing portion 22. Most of the components including the processor 19 are mounted below the controller PCB/mounting plate 13 within the housing.

In an embodiment, a sensor chassis 34 is provided above the controller PCB/mounting plate 13.

As shown in FIG. 10 in particular, the lights 15 are mounted relative to an upper surface of the controller PCB/mounting plate 13, and a plurality of resiliently mounted actuator sensor 18 are mounted above the controller PCB/mounting plate 13. Preferably, the actuator sensors 18 are mounted to and extend upwardly above the controller PCB/mounting plate 13 above the sensor chassis 34.

The power supply includes a battery 14. Preferably, the battery is rechargeable, in situ. As mentioned above, a charging port 33 is provided which is externally accessible. The charging port will typically be waterproof and/or dustproof.

The battery of the embodiment illustrated is a lithium polymer rechargeable via waterproof connector, with a life of active use of 1-hour, passive use (switched on not actively using) of 5-6 hours, and standby/off use of approximately 2 weeks+.

The lights 15 are provided within the housing of the internal core 11. Although any type of light may be provided, one or more LEDs or similar are preferred for their small size, low power usage and adjustability in terms of brightness, colour and/or whether they are lit or not.

The number of lights 15 provided in the internal core 11 corresponds to the number of separated wings or buttons which are provided. In an embodiment where eight separated wings or buttons 28 are provided, eight lights 15 are provided, one for each of the separated wings or buttons 28 and where a separated wing or button 29 is provided on the pole of the upper housing portion 21, a light 15 is provided for that wing or button 29 as well.

As shown in FIG. 10, each of the lights 15 is provided relative to an upper side of the controller PCB/mounting plate 13. The lights 15 are upwardly and/or outwardly directed. In the illustrated embodiment, each light 15 is preferably offset from each wing or button 28 but the light 15 associated with the pole wing or button 29 is directly below that wing or button 29.

In the illustrated embodiment, a single, two-way, audio input/output component is provided, this case, configured as a speaker 16. Any type of speaker may be provided.

Figure 7:
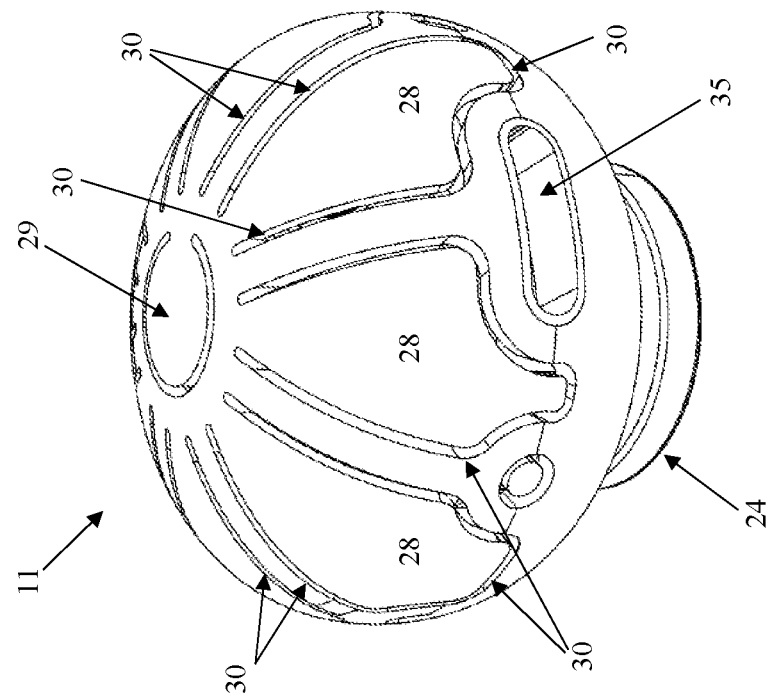
FIG. 7 is an axonometric view of the internal core illustrated in FIG. 6.
Figure 6:
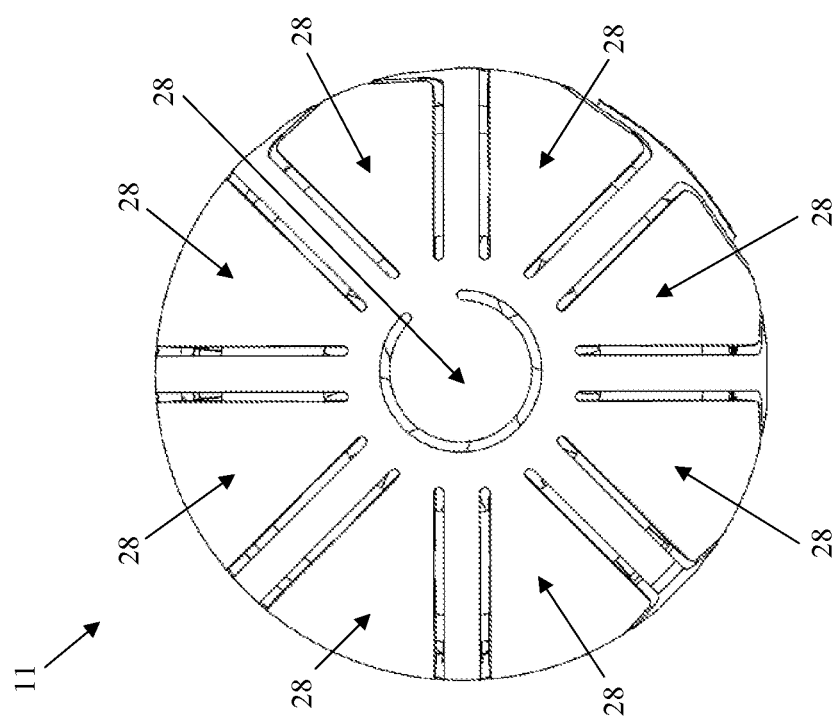
FIG. 6 is a plan view of an internal core of the device illustrated in FIG. 1.
Figure 9:
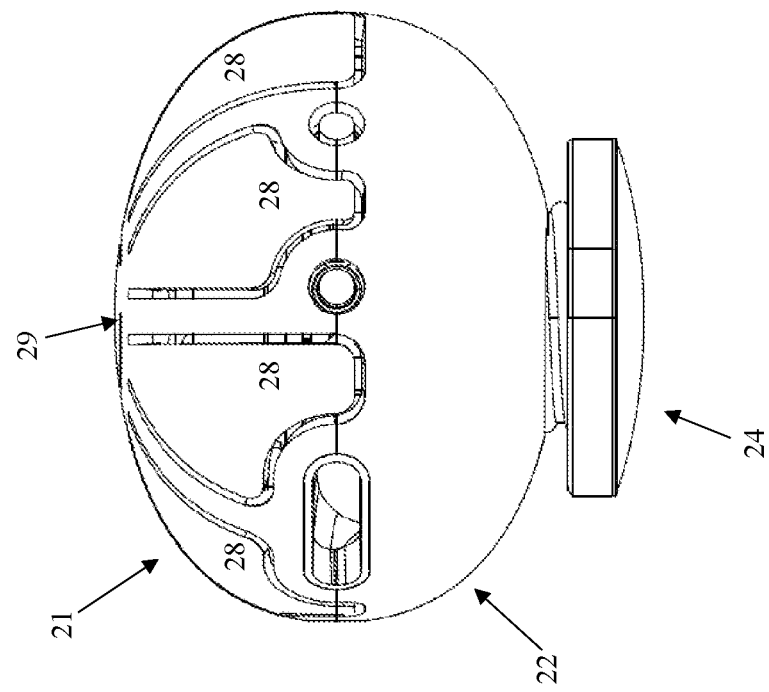
FIG. 9 is a front elevation view of the internal core illustrated in FIG. 7.
Figure 8:
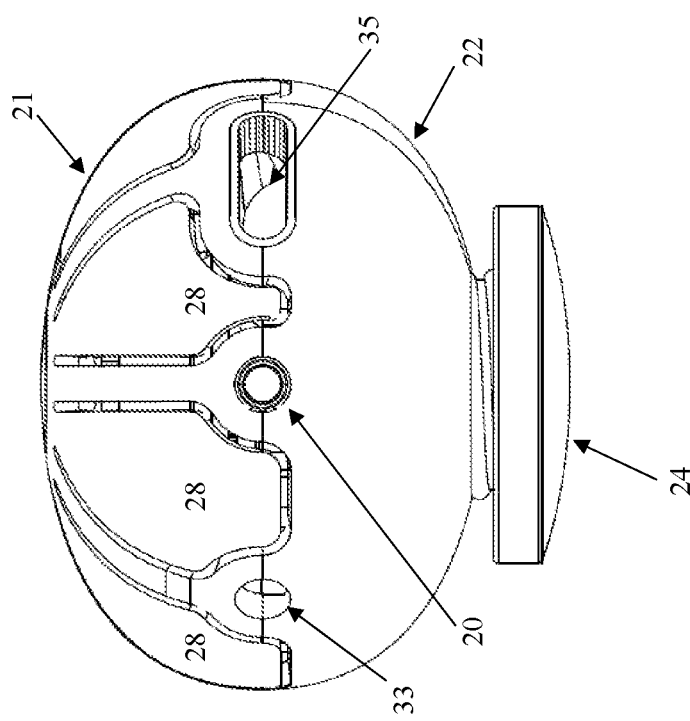
FIG. 8 is a side elevation view of the internal core illustrated in FIG. 7.

The speaker 16 is associated with a speaker horn 35 to direct the sound issuing from the speaker 16 in a particular direction. The speaker horn will preferably also direct external audio to the speaker 16 for capture. As illustrated in FIGS. 7 and 8, the outer end of the speaker horn 35 extends between the upper housing portion 21 and the lower housing portion 22 with the outer end of the speaker horn 35 substantially coplanar with the outer surface of the housing.

The two-way, audio input/output speaker 16 allows emission of sound and also capture of sound from a source external to the device 10.

An actuator sensor 18 is associated with each of the wings or buttons 28, 29 and with the controller PCB/mounting plate 13 and is configured to transmit touch inputs to the controller PCB/mounting plate 13 to control operation of the device.

In the illustrated form, the actuator sensor 18 is a force sensitive resistor (FSR) sensor. This type of sensor detects touch and also measures the force applied to the FSR sensor. The force is measured in terms of degree or quantum of force but it could be used to measure duration of application of the force. The device 10 can then use the detected touch and the measured degree or quantum of the force applied to the FSR sensor, to actuate different functions depending on the measured degree or quantum of the force applied. The device 10 could use the detected touch and the measured duration of application of the force applied to the FSR sensor, to actuate different functions depending on the measured duration of application of the force applied.

In the illustrated embodiment, the FSR sensor is resiliently mounted relative to the controller PCB/mounting plate 13 within the housing of the internal core, on an elongate arm. As seen best in FIGS. 10 and 11, the arm extends at an angle to the controller PCB/mounting plate 13 in order to fit within the housing. A part of the FSR sensor abuts or is closely spaced from a portion of an inner surface of a wing or button 28, 29 when at rest.

Preferably, an FSR sensor is provided relative to each of the wings or buttons 28, 29 of the upper housing portion 21. The number of FSR sensors provided is in one-to-one conformity with the number of lights 15 provided. Touching a wing or button 28, 29 will cause the FSR sensor to actuate at least one light 15. Touching a wing or button 28, 29 with a higher level of force (or a longer duration) will cause the FSR sensor to actuate control functionality to allow the user to change the operation of the device and or the function actuated by the particular wing or button 28, 29.

Touching a wing or button 28, 29 may actuate more than one light. Touching a wing or button 28, 29 may actuate more than one control function.

For example, touching a wing or button 28, 29 with one level force may actuate the light between on or off, touching with a different level force actuating a particular colour of light and touching with a third level force actuating control functionality. Instead, there may be only two levels of force, a first level at which the light is on in a particular colour, allowing the user to cycle through the colours available, and a second level force actuating control functionality associated with that wing or button 28, 29.

As shown, the FSR sensors are mounted relative to the sensor chassis 34. The sensor chassis 34 is provided above the controller PCB/mounting plate 13, below the sensors and below the upper housing portion 21. The sensor chassis 35 illustrated is partly spherical in shape. A sensor pad 36 is provided on the sensor chassis 35 for each of the sensors.

Each FSR sensor may be provided with portion 37 to enhance tactile comfort, such as to provide particular tactile feel and/or to minimise clicking.

Audible, visual and/or tactile feedback will normally be provided when a wing or button is pressed and a sensor is actuated. For example, typically a light will be lit when a wing or button is pressed. A vibration may be provided when a wing or button is pressed. The feedback may be provided in different intensities or different types dependent upon the force applied to the wing or button.

The outer casing 12 is provided from any flexible material, but a cushioning or shock absorbent material is preferred. Silicone is used for construction of the outer casing 12 in the illustrated embodiment to provide tactile comfort for user and also cushioning characteristics to protect components within the internal core 11, and to protect the internal core 11 itself.

As shown in FIG. 13 in particular, the outer casing 12 has an ovoid shape, continuous except for access openings provided to allow access to or from components of the device (best shown in FIGS. 1 to 5) and a main access opening 38. As shown in FIGS. 1 to 5, a plurality of speaker holes are provided in the outer casing 12. An opening may be provided for the power button 20 and/or a charging port 33 if provided. An opening may be provided for one or more volume buttons (increase/decrease).

Alternatively, depressible control buttons may be provided relative to the internal core (for power, volume etc) and the flexible outer casing 12 is provided with locating depressions 42 such as those illustrated in FIG. 11. In that configuration, the flexible outer casing 12 simply deforms when pressed in the locating depressions 42 to actuate the depressible control buttons.

Figure 1:
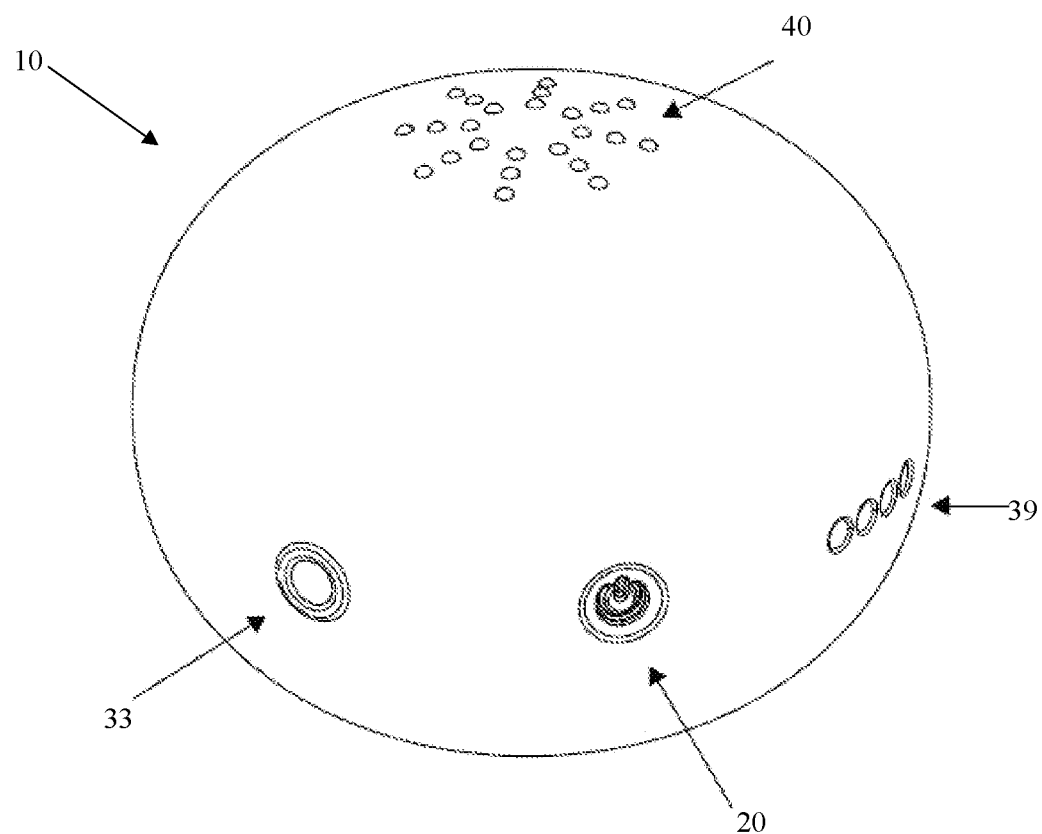
FIG. 1 is an axonometric view of a touch sensitive audio-visual input/output device according to an embodiment.
Figure 2:
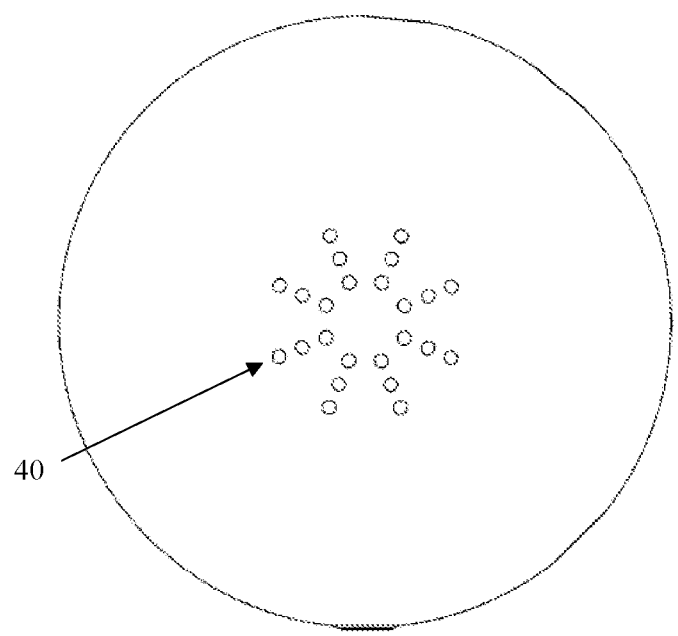
FIG. 2 is a top view of the device illustrated in FIG. 1.
Figure 3:
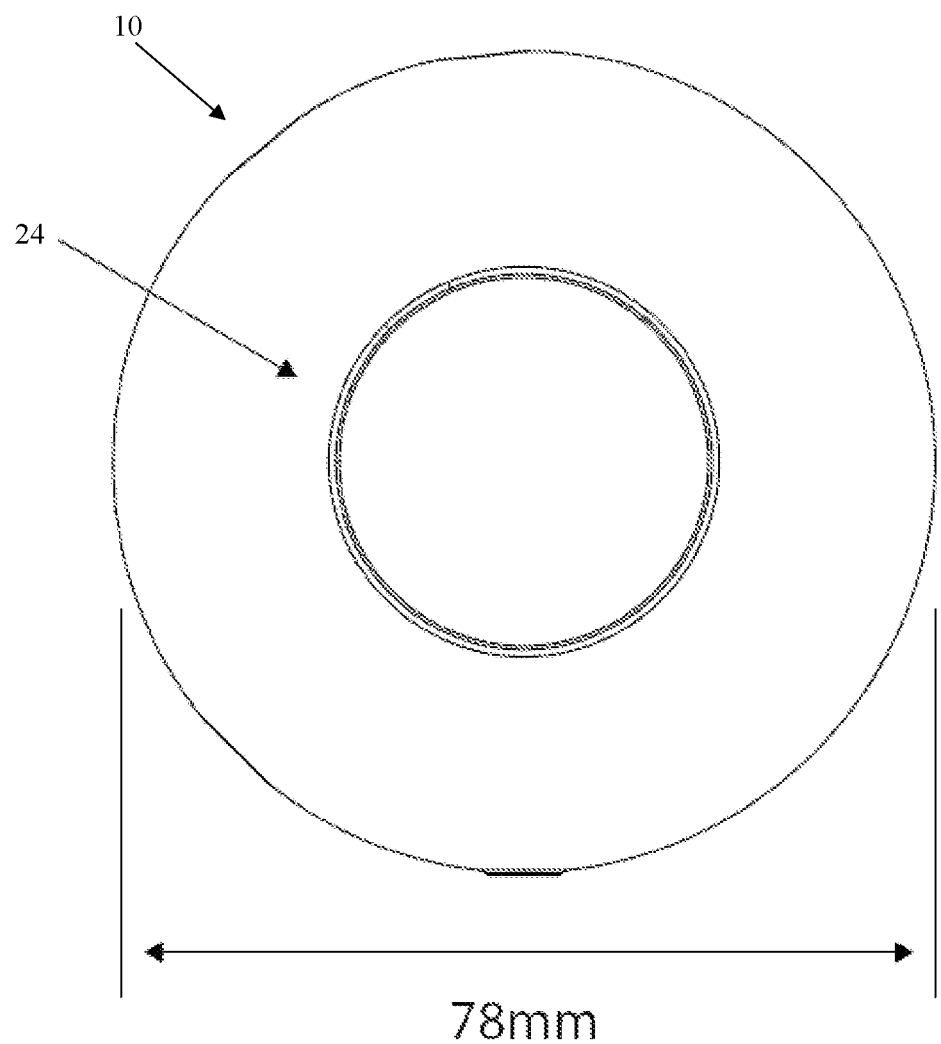
FIG. 3 is a view of the device illustrated in FIG. 1 from below.
Figure 5:
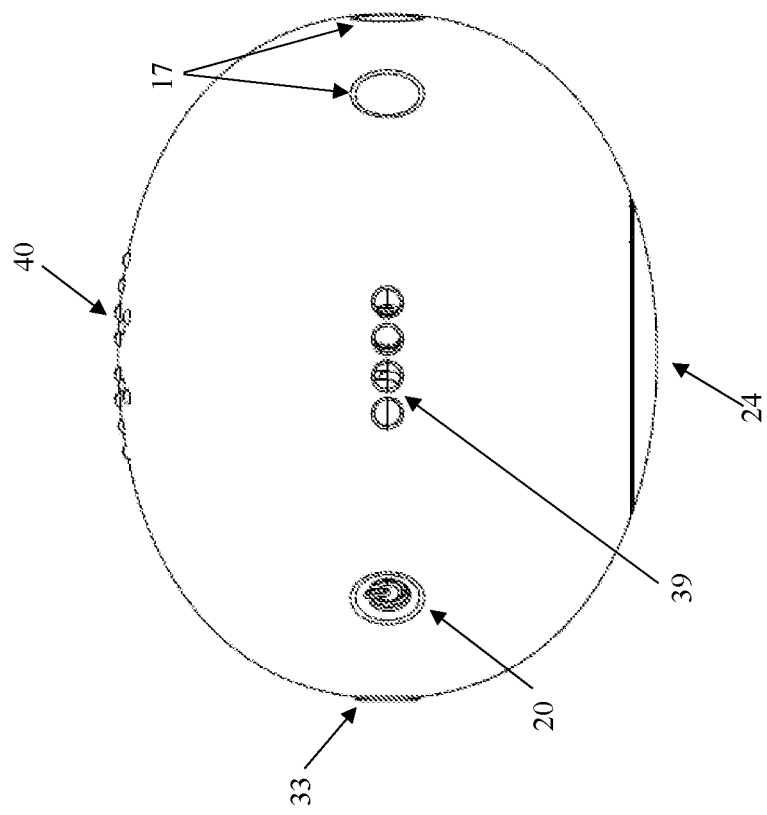
FIG. 5 is a front elevation view of the device illustrated in FIG. 1.
Figure 4:
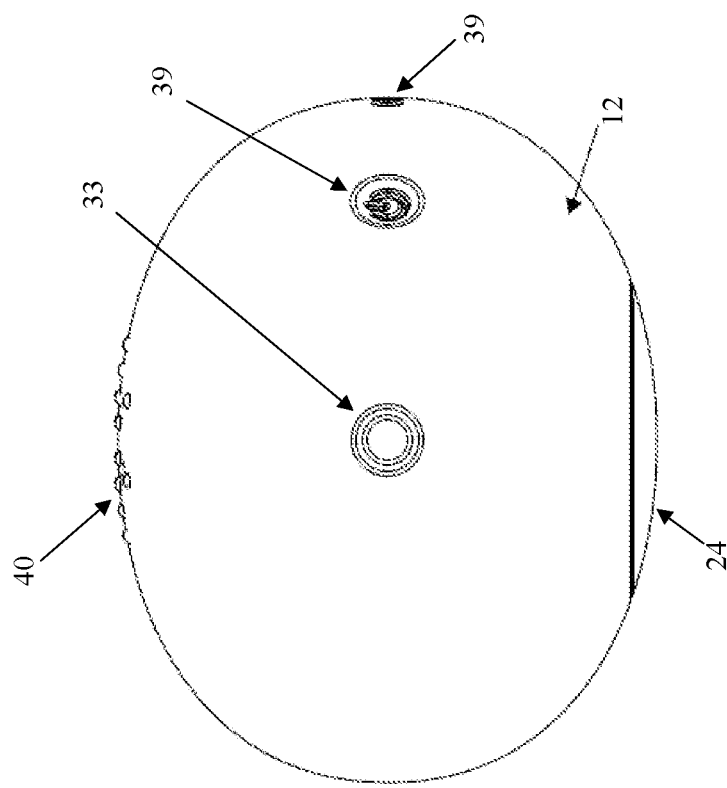
FIG. 4 is a side elevation view of the device illustrated in FIG. 1.

Any control buttons for basic functionality such as power volume for example will typically be provided at or close to the equator of the device as shown in FIG. 1, spaced about the equator of the device 10 or at least separated from one another.

In the illustrated embodiment, a number of protrusions 40 may be provided, preferably the pattern which is recognisable to the user. The protrusions 40 may form a logo. As shown, the protrusions 40 are provided adjacent to the upper pole of the outer casing 12. In this position, the protrusions 40 will typically overlie a light 15 and/or a wing or button 29 that when pressed, will typically illuminate the protrusions in the pattern.

The provision of a flexible outer casing 12 allows the user to depress the wings or buttons 28, 29 on the internal core 11 through the outer casing 12 whilst also being comfortable to touch. The provision of a translucent outer casing 12 will typically diffuse or obscure the nature and appearance of the internal core 11.

The outer casing 12 is resilient and deformable.

The main access opening 38 is provided in the outer casing 12, at a lower side thereof to allow access to, and insertion and removal of the internal core 11 from the outer casing 12 by deforming the outer casing 12 in order to allow passage of the internal core 11 through the opening 38.

As shown in FIG. 13, the opening 38 in the outer casing 12 is surrounded with a ledge portion 41 provided circumferentially about the opening of lesser thickness than the main part of the outer casing 12. In use, the ledge portion 41 is clamped between the outer surface of the internal core 11 and the enlarged head 25 of the plug 24 in order to seal the outer casing 12 about the core 11.

Providing a touch sensitive audio-visual input/output device 10 in this configuration will enhance the functionality of the device 10 and the user experience with the device 10, particularly due to the inclusion of the at least one audio input component associated with the controller. The audio input component will preferably allow the device 10 to receive or capture audio input, such as from a song or music track, and allow the device 10 to adjust its operation, preferably its visual appearance based on the audio input as well as to allow manipulation of the audio input prior to playback, transmission and/or storage.

The one or more embodiments are described above by way of example only. Many variations are possible without departing from the scope of protection afforded by the appended claims.

The invention claimed is:

1. A touch sensitive audio-visual input/output device comprising:
   i. an internal core comprising:
      an outer housing;
      a controller, the controller associated with at least one processor and at least one memory store;
      at least one light emitter associated with the controller;
      at least one audio output component associated with the controller; and
      at least one actuator associated with the controller and configured to transmit touch inputs to the controller to control operation of the device;
      wherein the controller, the at least one light emitter, the at least one audio output component and the at least one actuator are provided within the outer housing, and wherein the outer housing of the internal core has a plurality of flexible wings each overlying the at least one actuator to transmit touch input to the at least one actuator; and
   ii. a flexible, translucent outer casing for at least partially enclosing the internal core, wherein the outer casing is removable from the internal core.

2. The touch sensitive audio-visual input/output device as claimed in claim 1 further comprising at least one communication component configured to allow the device to send and/or receive sounds, music, information and/or instructions, at least some of which prompt functionality or operational changes in the device.

3. The touch sensitive audio-visual input/output device as claimed in claim 2 wherein the at least one communication component is configured to provide at least one communication pathway on a one-to-one basis between like devices.

4. The touch sensitive audio-visual input/output device as claimed in claim 2 wherein the at least one communication component is configured to provide at least one communication pathway on a one-to-many basis between like devices.

5. The touch sensitive audio-visual input/output device as claimed in claim 2 wherein the at least one communications component is configured to allow connection or syncing of a first device with a remote personal computing device, in order to send/receive information including operating instructions, or sound or music for playback.

6. The touch sensitive audio-visual input/output device as claimed in claim 5 wherein the at least one communications component is configured to allow the at least one communications pathway to transmit information regarding the illumination of the at least one light emitter provided on the device actuated by a user and to cause generation and display of one or more interfaces on the remote personal computing device to simulate or copy the illumination of the at least one light emitter on the device.

7. The touch sensitive audio-visual input/output device as claimed in claim 2 wherein the at least one communication component and at least one communication pathway is configured to detect a second device and/or remote personal computing device in a proximity of the first device.

8. The touch sensitive audio-visual input/output device as claimed in claim 7 wherein a proximity trigger results in at least one of the devices issuing an audio, tactile and/or visual alert to the users of the respective devices.

9. The touch sensitive audio-visual input/output device as claimed in claim 2 wherein communication to/from the device occurs in real time.

10. The touch sensitive audio-visual input/output device as claimed in claim 2 wherein the device is configured to transmit information via the at least one communication component to export audio files or other information such as lighting pattern instructions.

11. The touch sensitive audio-visual input/output device as claimed in claim 1 further comprising at least one audio input component configured to capture audio with the captured audio being available for storage, playback and/or manipulation by the device.

12. The touch sensitive audio-visual input/output device as claimed in claim 1 wherein a music track is optimised for playback using the device, the optimized music track comprising information or components, which trigger functionality or actions on the device.

13. The touch sensitive audio-visual input/output device as claimed in claim 1 wherein functionality or actions of the device are adjustable using the at least one actuator to provide instructions to the controller.

14. The touch sensitive audio-visual input/output device as claimed in claim 1 further comprising operating software provided on-board configured to allow manipulation of at least a portion of any audio played through or captured by the device.

15. The touch sensitive audio-visual input/output device as claimed in claims 5 wherein a function of the at least one actuator is adjustable using the cooperative software application from which instructions relating to the function of the at least one actuator is transmitted to the device.

16. The touch sensitive audio-visual input/output device as claimed in claim 1 wherein at least one light emitter is associated with each at least one actuator.

17. The touch sensitive audio-visual input/output device as claimed in claim 1 wherein each at least one actuator is, includes or is associated with a force sensitive sensor to detect touch and measure one or more characteristics of a force applied to the at least one actuator, to actuate different functions depending on the one or more characteristics of the force applied.

18. The touch sensitive audio-visual input/output device as claimed in claim 1 wherein the outer casing is resiliently deformable.

19. An entertainment system including a touch sensitive audio-visual input/output device as claimed in claim 1, and a software application operating on the touch sensitive audio-visual input/output device to control functionality of the device.

20. The entertainment system as claimed in claim 19 wherein a cooperative software application operating on a personal computing device provides media and/or control instructions to the touch sensitive audio-visual input/output device.

21. The entertainment system as claimed in claim 20 wherein the touch sensitive audio-visual input/output device provides information to the cooperative software application allowing the cooperative software application to cause the personal computing device to display information on a display thereof.

22. The touch sensitive audio-visual input/output device as claimed in claim 1, wherein the flexible wings are formed by a plurality of incisions made through the outer housing to partially separate a wing portion from the outer housing.

* * * * *